United States Patent
Poslinski et al.

(10) Patent No.: US 7,889,973 B2
(45) Date of Patent: Feb. 15, 2011

(54) METHOD AND APPARATUS FOR PARTIAL FILE DELETE

(75) Inventors: Thomas F. Poslinski, San Diego, CA (US); Kim Annon Ryal, Poway, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1005 days.

(21) Appl. No.: 10/700,802

(22) Filed: Nov. 3, 2003

(65) Prior Publication Data

US 2004/0091239 A1    May 13, 2004

Related U.S. Application Data

(63) Continuation-in-part of application No. 10/272,177, filed on Oct. 15, 2002, now Pat. No. 6,775,461.

(51) Int. Cl.
*H04N 5/93* (2006.01)

(52) U.S. Cl. .................. 386/278; 386/291; 386/281; 386/326

(58) Field of Classification Search ......... 386/125–126, 386/111–112, 52, 55, 83, 124, 278, 291, 386/281, 326
See application file for complete search history.

(56) References Cited

U.S. PATENT DOCUMENTS

| | | | |
|---|---|---|---|
| 5,592,669 A * | 1/1997 | Robinson et al. | 707/206 |
| 5,671,420 A * | 9/1997 | Bell et al. | 717/167 |
| 5,729,649 A | 3/1998 | Lane et al. | |
| 5,872,905 A * | 2/1999 | Ono et al. | 714/5 |
| 5,930,827 A * | 7/1999 | Sturges | 711/170 |
| 6,147,823 A | 11/2000 | Matsumi et al. | |
| 6,233,695 B1 * | 5/2001 | Ahn | 713/400 |
| 6,260,170 B1 | 7/2001 | Lee | |
| 6,311,011 B1 | 10/2001 | Kuroda | |
| 6,324,338 B1 | 11/2001 | Wood et al. | |
| 6,389,223 B1 | 5/2002 | Aotake | |
| 6,584,278 B2 | 6/2003 | Ando et al. | |
| 6,775,461 B2 | 8/2004 | Poslinski et al. | |
| 6,831,652 B1 * | 12/2004 | Orr | 345/543 |
| 7,016,946 B2 * | 3/2006 | Shirriff | 709/221 |
| 7,042,417 B2 * | 5/2006 | Santhoff et al. | 343/893 |

(Continued)

FOREIGN PATENT DOCUMENTS

WO    WO 92/22983 A2    12/1992

*Primary Examiner*—Thai Tran
*Assistant Examiner*—Helen Shibru
(74) *Attorney, Agent, or Firm*—Fitch, Even, Tabin & Flannery

(57) ABSTRACT

A method of increasing the available storage space on an electronic storage medium comprising the steps of providing a free memory list for the electronic storage medium; selecting a portion of a file stored on the electronic storage medium; and adding the selected portion of the file to the free memory list. A method of increasing the available storage space on a personal video recorder comprising the steps of storing a media file on a memory of the personal video recorder; receiving a signal for marking a starting flag for the media file; receiving a signal for marking an ending flag for the media file; and freeing the memory of the personal video recorder that contains a portion of the media file between the starting flag and the delete flag.

3 Claims, 7 Drawing Sheets

U.S. PATENT DOCUMENTS

| | | | |
|---|---|---|---|
| 7,042,471 B2 * | 5/2006 | Glass et al. | 345/636 |
| 7,058,135 B2 * | 6/2006 | Poslinski et al. | 375/262 |
| 7,106,946 B1 * | 9/2006 | Kato | 386/69 |
| 2002/0110353 A1 | 8/2002 | Potrebic et al. | |
| 2002/0174430 A1 | 11/2002 | Ellis et al. | |
| 2003/0044170 A1 | 3/2003 | Haddad et al. | |
| 2003/0105918 A1 * | 6/2003 | Plourde, Jr. | 711/112 |
| 2003/0115274 A1 * | 6/2003 | Weber | 709/206 |
| 2003/0126201 A1 * | 7/2003 | Hoang | 709/203 |
| 2003/0133022 A1 | 7/2003 | Melton | |
| 2004/0027890 A1 * | 2/2004 | Nakanishi et al. | 365/202 |
| 2004/0264947 A1 * | 12/2004 | Okada et al. | 386/125 |

* cited by examiner

METHOD AND APPARATUS FOR PARTIAL FILE DELETE

This application is a Continuation-in-part of U.S. patent application Ser. No. 10/272,177, filed Oct. 15, 2002, entitled A DATA MANAGEMENT METHOD FOR RECORDED PROGRAMS STORED ON A DIGITAL RECORDING DEVICE, which is incorporated by reference in its entirety.

BACKGROUND OF THE INVENTION

1. Field of the Invention

The present invention relates generally to the management of data files. Even more specifically, the present invention relates to a system and method for partially deleting a data file.

2. Discussion of the Related Art

Personal video recorders (PVR), also known as digital video recorders (DVR) are electronic devices that are used for storing audio and video information received over any number of communication channels. The audio and video information is stored as a data file on a memory device of the PVR. The data file can be very large. For example, a two hour program at 3 megabits per second has a file size of 2.7 gigabytes. A large amount of memory is needed to store one file of this size and users of a PVR generally store multiple files. Because of the large size of the video files, the amount of memory available on the PVR is a limited resource. Thus there is a need for a user to easily manage the files that are recorded on the PVR.

In a PVR application, a user records television programs of varying length onto a high capacity storage device. The high capacity storage device is limited in size, thus only a finite number of programs can be recorded. Thus, there is a need for the user of a PVR to easily be able to control the storage of television programs on the high capacity storage device in order to optimize the limited size of the high capacity storage device.

SUMMARY OF THE INVENTION

In one embodiment, the invention can be characterized as a method of increasing the available storage space on an electronic storage medium comprising the steps of providing a free memory list for the electronic storage medium; selecting a portion of a file stored on the electronic storage medium; and adding the selected portion of the file to the free memory list. In a preferred embodiment, the file is an audio/video file.

In another embodiment, the invention can be characterized as a method of increasing the available storage space on a personal video recorder comprising the steps of storing a media file on a memory of the personal video recorder; receiving a signal for marking a starting flag for the video file; receiving a signal for marking an ending flag for the video file; and freeing the memory of the personal video recorder that contains a portion of the media file between the starting flag and the delete flag.

In a further embodiment, the invention may be characterized as a method of increasing the available storage space on a personal video recorder comprising the steps of searching for a start program time stamp marking a media file; searching for a first full image frame related to the start program time stamp; searching for an end program time stamp marking the media file; searching for a second full image frame related to the end program time stamp; and deleting a portion of the media file between the first full image frame and the second full image frame.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION

The following description is not to be taken in a limiting sense, but is made merely for the purpose of describing the general principles of the invention. The scope of the invention should be determined with reference to the claims.

Figure 1:
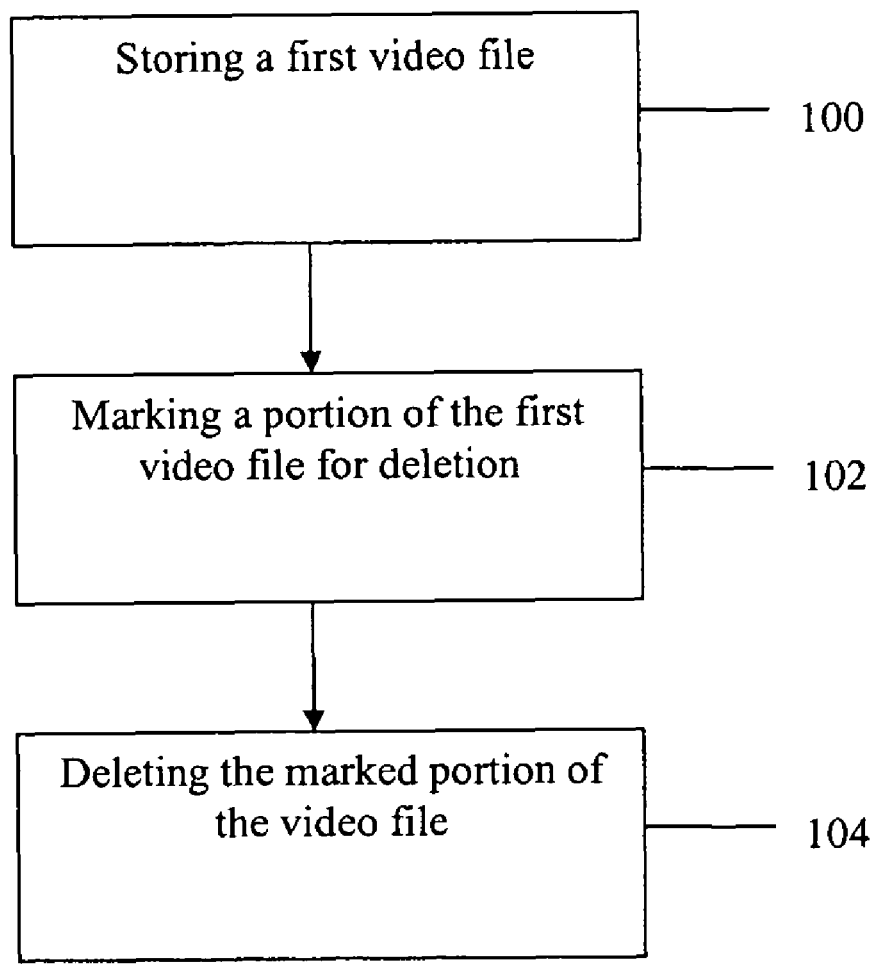
FIG. 1 is a flow diagram illustrating a method of deleting a portion of a media file.

Referring to FIG. 1 a flow diagram is shown illustrating a method of deleting a portion of a media file.

The media file may be any file that contains audio or video or combination thereof. For example, the file may be only an audio file, only a video file, or a media file containing both audio and video information.

The following method will be described in terms of a video file, however, it should be understood that the video file can be any media file. First the video file is stored in the memory of a personal video recorder (PVR), also know as a digital video recorder (DVR) 100.

Next a portion of the video file is marked for deletion 102. Many different ways of marking the file for deletion can be used in accordance with the present invention. For example, a user of the PVR is able to mark a portion of the video file while searching through the video file. Alternatively the user can select a time offset from the beginning of the file from which to start the deletion and a time offset from the beginning of the file from which to stop the deletion. The portion of the video between the two time offsets is deleted.

Finally, the marked portion of the video file is deleted from the PVR 104. This adds to the available space in the memory of the PVR for storing additional files.

In one example a 2 hour program is originally stored on the PVR. For a data stream at 3 megabits per second, the 2 hour program would occupy 2.7 gigabytes of the memory of the PVR. A user could then mark the first 1.5 hours of the file for deletion. After the deletion there would only be 0.5 hours of the file remaining, thus occupying 0.675 gigabytes of the memory of the PVR. This amounts to a 2.025 gigabyte savings in available memory space.

In another example, a user can mark a 2 hour program with start flags and stop flags such that multiple different sections of the video file are marked for deletion. In a 2 hour program generally there are commercials every 15 minutes that a user may not want to store and replay later. Advantageously, the file can be marked with start and stop flags such that all of the commercials are removed from storage and the sections of the video file are linked back together. Deleting the unwanted commercials from the video file frees up memory space allowing more video files to be later recorded. Advantageously, deleting unwanted commercials also provides for a more enjoyable playback for the user of the PVR as the video being watched will be played back without the commercial interruptions. Alternatively, one section of the video file can be marked with a start flag and a stop flag. The portion of the video file marked with the start flag and the stop flag is deleted.

Figure 2:
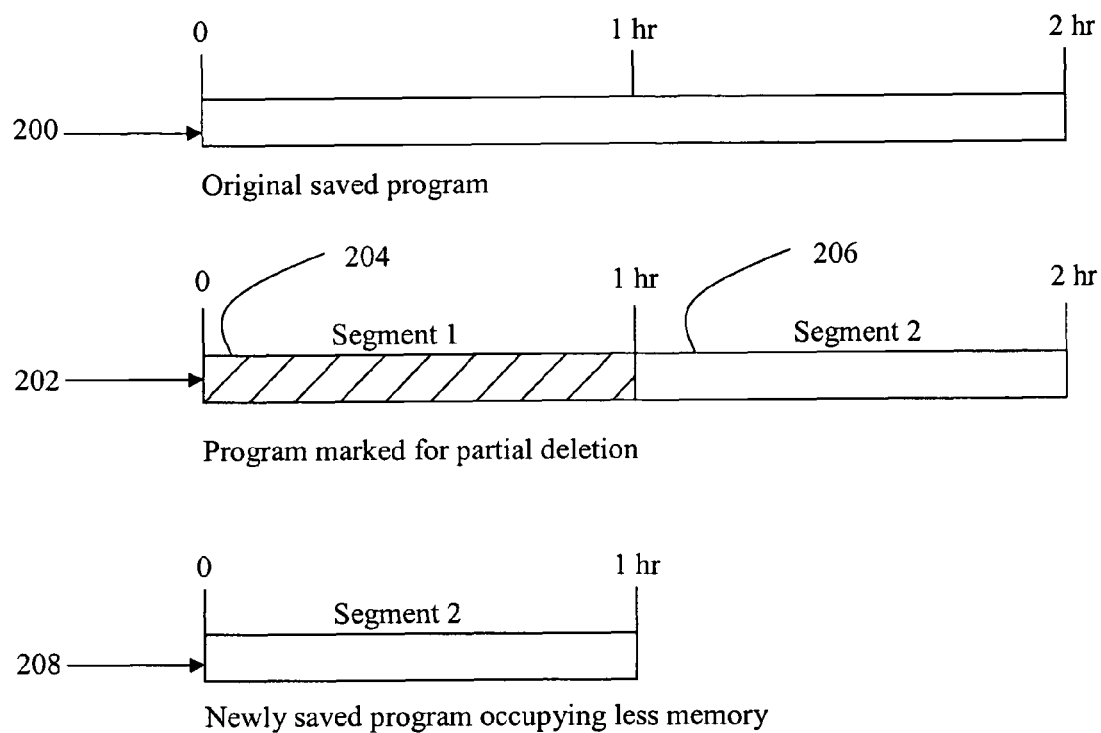
FIG. 2 is a diagram illustrating deleting a portion of a marked video file in accordance with one embodiment of the method shown in FIG. 1.

Referring to FIG. 2 a diagram is shown illustrating the deletion of a portion of a marked media file in accordance with one embodiment of the method shown in FIG. 1. Shown is a first media file 200, a marked media file 202, a first media segment 204, a second media segment 206, and a second media file 208.

The first media file 200 is stored on the PVR. The first media file 200 is then marked for the deletion of a portion of the first media file 200. The marked media file 202 represents the first media file 200 after it has been marked for partial deletion. The portion marked for deletion is represented as the first media segment 204. The second media segment 206 is the portion of the first media file 200 that will continue to be saved on the memory of the PVR. The first media segment 204 can be any portion of the first media file 200. Additionally, it is within the scope of the present invention that multiple portions of the first media file 200 can be marked for deletion.

The second media file 208 consists of the second media segment 206 from the marked media file 202. In accordance with the present invention, a new file may either be written containing only the second media segment 206 or the portion of the memory containing the first media segment 202 may be deallocated. The deallocation of a file will be described in more detail herein with reference to FIGS. 5 and 6.

Figure 3:
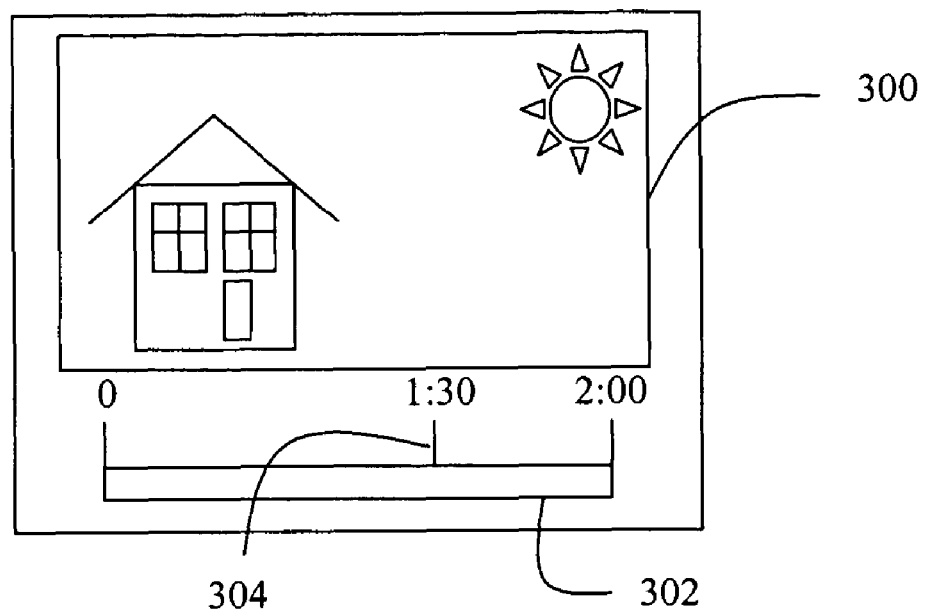
FIG. 3 is a diagram illustrating deleting a portion of a video file in accordance with another embodiment of the method shown in FIG. 1.
Figure 3:
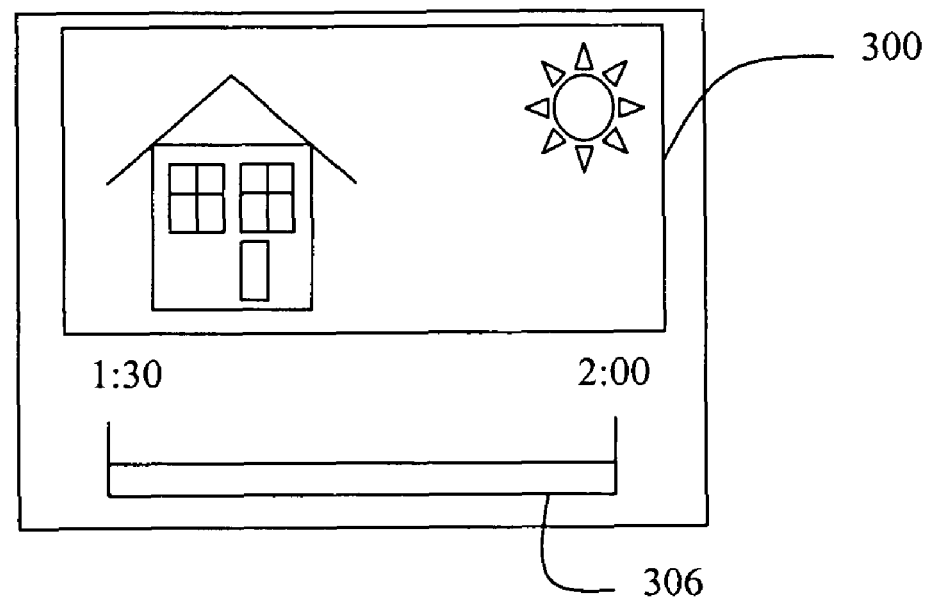

Referring to FIG. 3 a diagram is shown illustrating deleting a portion of a video file in accordance with another embodiment of the method shown in FIG. 1. Shown is a frame image 300, a first video file 302, a deletion point 304, and a second video file 306.

The frame image 300 shows the video frame at the deletion point 304. The first video file 302 is shown marked at 1:30 for deletion. The second video file 306 is the portion of the first video file 302 after the deletion point 304. The frame image 300 is still shown, however, the frame image 300 is now representative of the beginning of the second video file 306, rather than the frame image at the deletion point 304 of the first video file 302.

Advantageously, by showing the frame image 300 at the deletion point 304, a user of the device is able to easily select the deletion point 304 which they would like removed. In one example, a user is able to go through the first video file 302 and delete all or some of the commercials from the first video file 302. In this example, a user can optionally select multiple deletion points such that sections of the first video file 302 are removed. Advantageously, this provides for more storage space on the PVR and also allows a user to remove unwanted commercials or other unwanted portions of the first video file 302.

Figure 4:
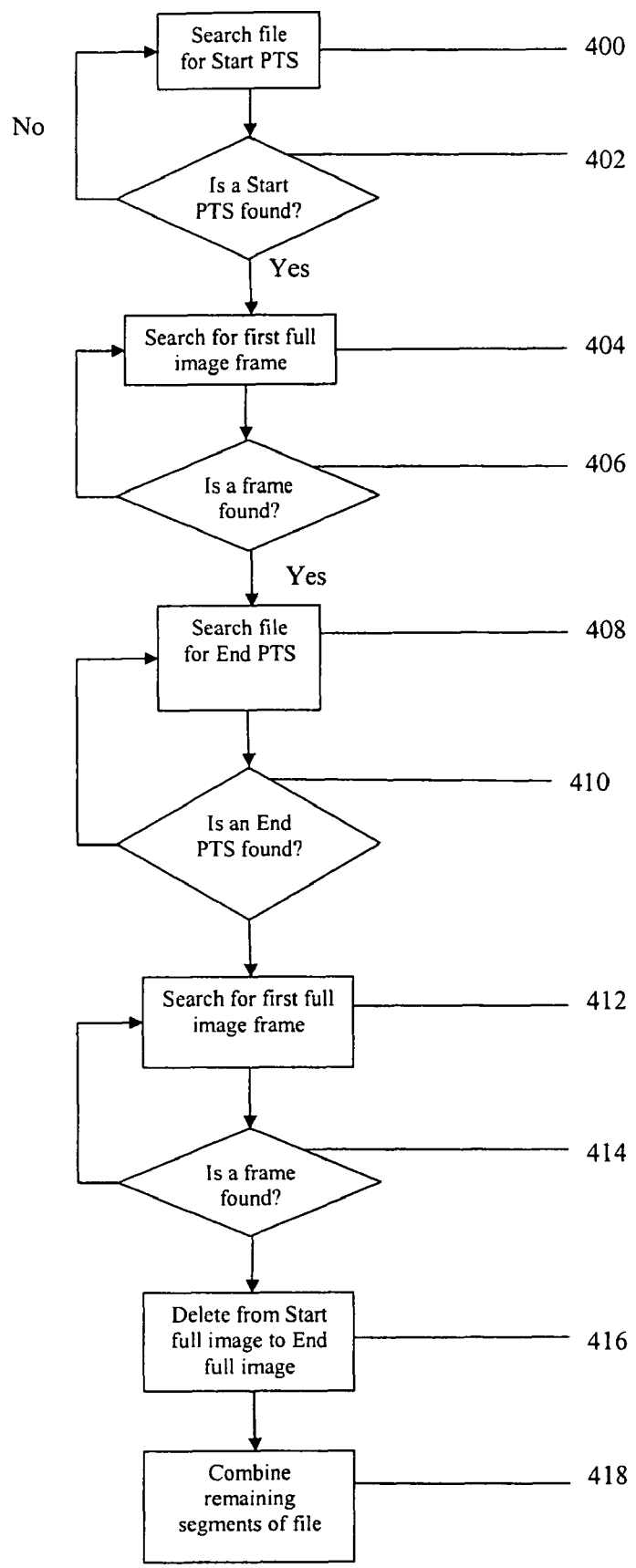
FIG. 4 is a flow diagram illustrating another method of deleting a portion of a media file.

Referring to FIG. 4 a flow diagram is shown illustrating a method of deleting a portion of a video file. The video file is stored on the personal video recorder (PVR). Generally, the video file includes video frames, audio frames and presentation time stamps (PTS). The PTS is a piece of data that synchronizes the audio frames with the video frames in an audio/video (AV) data stream. As the program is played, the PTS increases relative to the time into the program.

In operation, a search is made for a start presentation time stamp (PTS) 400. The start PTS is representative of the beginning of a section of the video file marked for deletion. In one example, the beginning of the file will be the start PTS. In decision block 402, if the start PTS is not found the operation will start over, however, if the start PTS is found a search is made for a first full frame image 404. The first full frame image is representative of the start PTS. In one example the first full frame image is a full frame image that is immediately before or after the start PTS. In decision block 406 if the first full frame image is not found the operation will continue searching for frames to find the first full frame image after the found PTS, however, if the first full frame image 404 is found a search is made for an end presentation time stamp (PTS) 408. The end PTS is representative of the ending of a section of the video file marked for deletion. In decision block 410 if the end PTS is not found the operation will continue searching for an end PTS that matches in the forward direction, however, if the end PTS is found a search is made for a second full frame image 412 that is found after the end PTS. The second full frame image is representative of the end PTS. In one example, the second full image is a full frame image that is immediately before or after the end PTS.

In decision block 414, if the second full frame image is not found, the operation continues searching the forward direction for a frame, unless an end of the file is found in which case the end of the file is used, however, if the second full frame image is found the portion of the video file from the start PTS to the end PTS is deleted or deallocated 416. In operation, the file is deleted between the first full frame image and the second full frame image. Any remaining video segments of the video file are then combined 418 to provide a new video file. The PTS values are adjusted to account for the time discontinuities in the file.

At the end of the deletion process, the new video file is smaller in size than the original video file. Additionally, the new video file will have no time discontinuities, thus the duration of the new video file is the same as the durations of the video segments that are combined in step 418.

Other methods of marking the video file for deletion can be used in accordance with the present invention. For example, the last read file offset of a playback could be used to mark a point of deletion.

Figure 5:
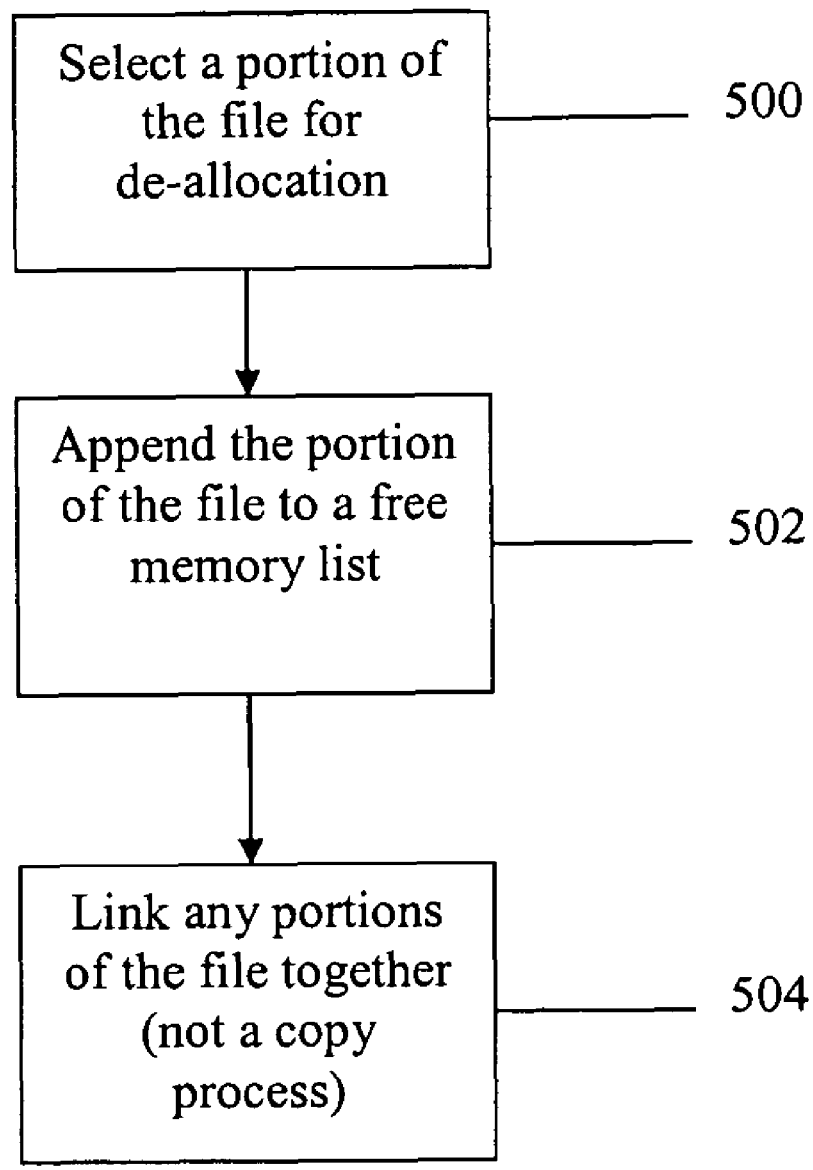
FIG. 5 is a flow diagram illustrating a method of deallocating a portion of a data file.

Referring next to FIG. 5 a flow diagram is shown illustrating a method of deallocating a portion of a data file.

In general, deallocation occurs when sectors representing the portions of the media file to be deleted are reassigned from the media file to the free list. A sector is a portion of data on the memory, typically 512 bytes. A file is made up of a list of the sectors. The portion to be deallocated is mapped to a sub-list of sectors in the media file. The sub-list of sectors is then removed from the media file and assigned to the free list. Thus, the deallocation of the file has been completed, i.e., a portion of the file is deleted without rewriting the non-deleted portions of the file to the memory. Advantageously, this can save many system resources when the media file becomes very large.

According to the illustrated method, first a portion of a file is selected for deallocation 500. The portion of the file that is selected for deallocation can be designated by a starting point (e.g., a first number of bytes from the beginning of the file) to the ending point (e.g., a second number of bytes from the beginning of the file). The starting point may be zero to indicate deallocation starting at the beginning of the file. The ending point may be any point after the starting point. When the ending point is at the end of the file or beyond the end of the file, the file will be deallocated up to the end of the file. The selected portion of the file is then appended to a free memory list 502. This makes the portion of the file that was deallocated available for storing other data or other files. Next, the remaining portions of the file are linked together 504.

In order for prior designs to remove a portion of a file, a new file would be rewritten to another section of memory and the entire previous memory space would be added to the free memory list. This can use up a large amount of system resources, e.g., if a portion of a large video file is removed, the prior designs would have to copy gigabytes of data from one memory location to another in order to create the new file.

In one example the file selected for deallocation is a video file. Advantageously, video files can be very large, thus the deallocation of the video file as compared to having the video file rewritten to another section of memory will save valuable system resources. In another embodiment, the file selected for deallocation is a audio file or a file with both audio and video data.

Figure 6:
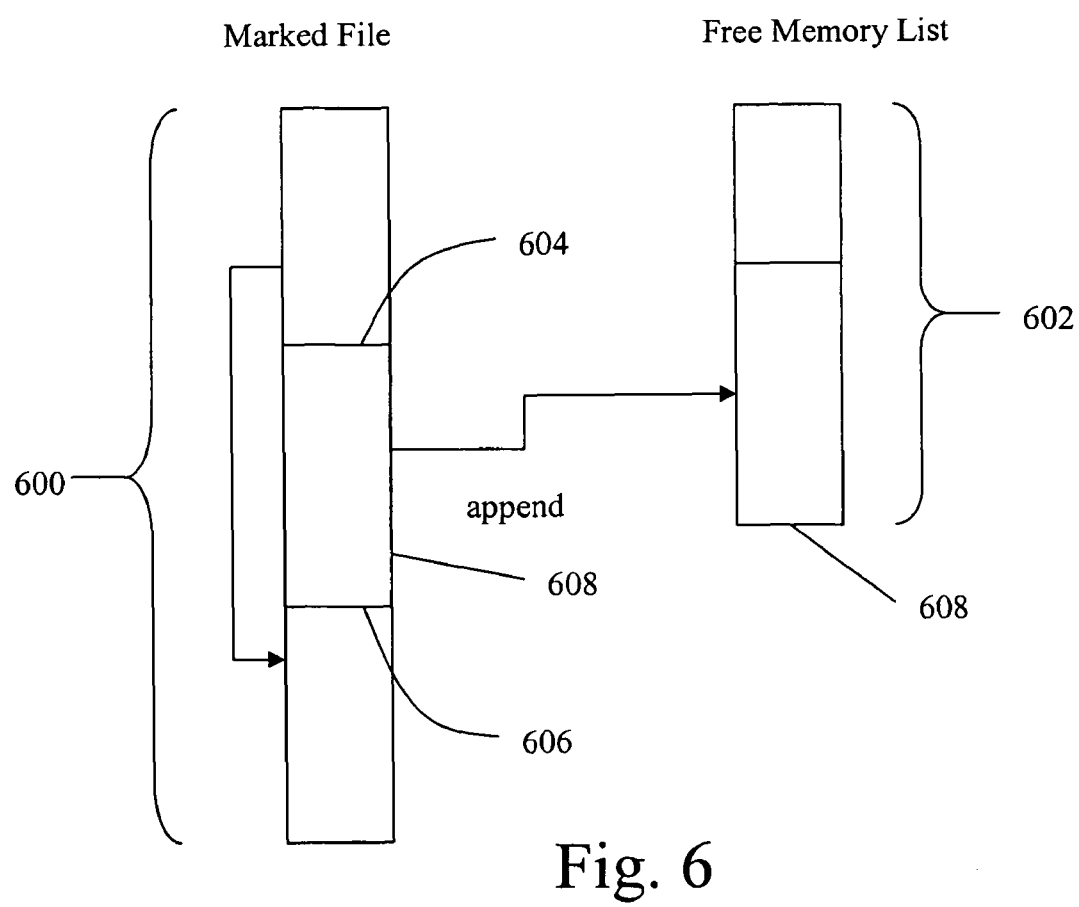
FIG. 6 is a diagram illustrating the deallocation of a portion of a data file in accordance with one embodiment of the method of FIG. 5.

Referring to FIG. 6 a diagram is shown illustrating the deallocation of a portion of a data file in accordance with one embodiment of the method of FIG. 5. Shown is a file marked for deletion 600, a free memory list 602, a start deletion point 604, an end deletion point 606, and a deleted section 608.

The deleted section is added to the free memory list 602. The remainder of the file is then linked together without copying the file to a new place in memory. In one preferred example, the deallocation of a file is used to delete a portion of a video file without having to recopy the remaining portion of the file to a new memory location. This saves valuable system resources.

Figure 7:
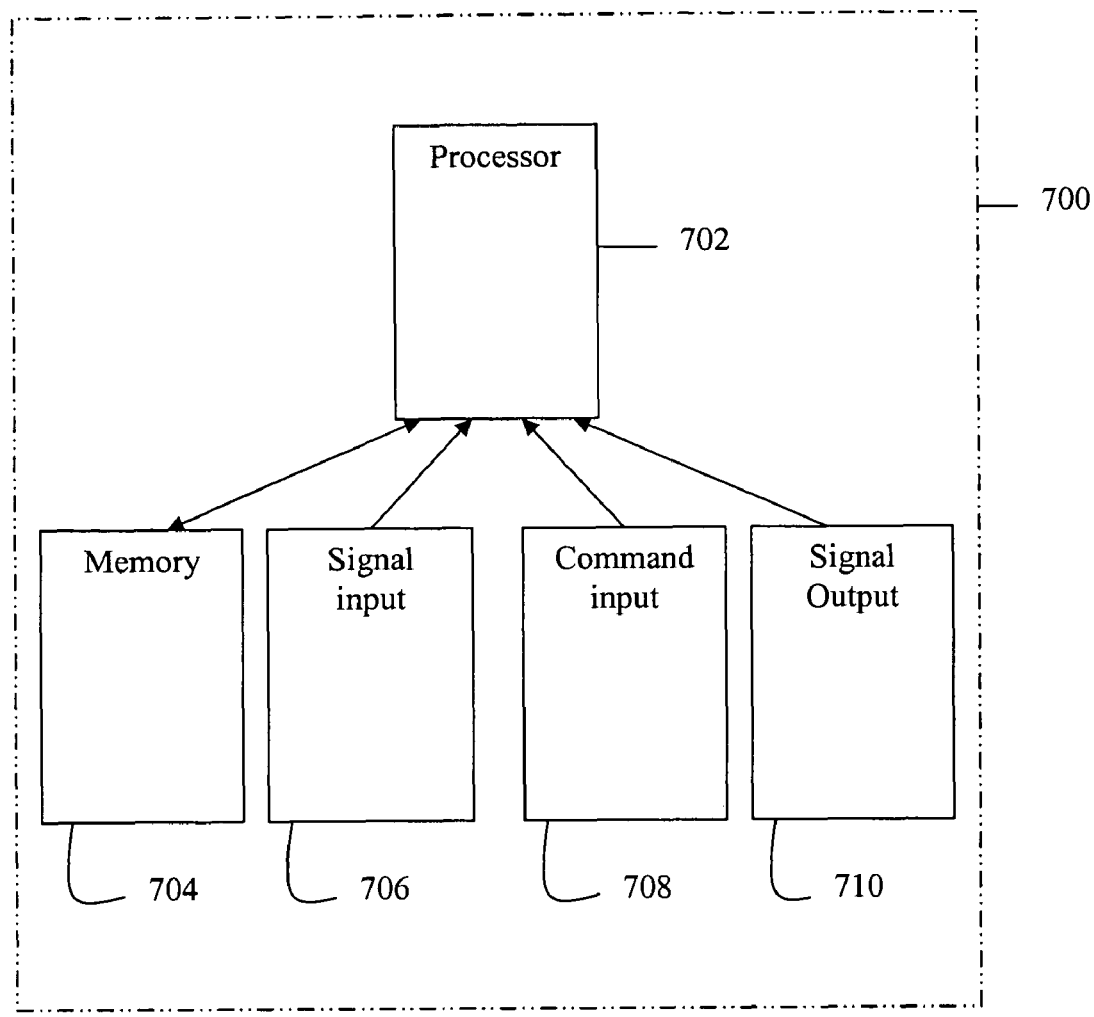
FIG. 7 is a block diagram illustrating a personal video recorder in accordance with the present invention.

Referring to FIG. 7 a block diagram is shown illustrating a personal video recorder in accordance with the present invention. Shown is a personal video recorder 700, a processor 702, a memory 704, a signal input 706, a command input 708, and a signal output 710.

The personal video recorder 700, also known as a digital video recorder comprises the processor 702, the memory 704, the signal input 706, the command input 708, and the signal output 710. The diagram shows a very broad overview of a personal video recorder such that it will be apparent that any digital recorder may be used in accordance with the present invention. The general configuration and operation of the personal video recorder 700 is known in the art and will not be described herein for the sake of brevity and clarity. Furthermore, common but well-understood elements that are useful or necessary are not depicted in order to facilitate a less obstructed view of the various embodiments of the present invention.

The signal input 706 can receive one or more of many different types video signals over any of video transmission channels. For example, the signal input can be an analog television signal, a digital television signal, or a high definition television signal. Additionally, the video transmission channel can be, for example, a television broadcast, a cable line, or a satellite broadcast.

The command input 708 can receive one or more signals from any type of input device. The input device allows a user to input commands to the personal video recorder. For example, the command input can receive signals from a remote control, a keyboard, a mouse, and a microphone (voice recognition). The input device allows a user to select programs to record on the personal video recorder 700 and can be used to view the recorded programs or programs scheduled for future recording. The input device may also provide the user with the ability to select a portion of a file for deletion or deallocation in accordance with the present invention described herein.

The signal output 710 can output one or more signals to almost any type of display monitor. For example, the signal output can output a digital television signal, an analog television signal, a high definition television signal. Generally, the output signal will correspond to the input signal received though the signal input 706. Additionally, the signal output can output data to the display monitor. In accordance with the present invention, the signal output can output a signal for displaying an interface that can be used to select a portion or portions of a file for deletion or deallocation.

The memory 704 can be many types of electronic storage medium such as is known in the art. The memory 704 stores recorded programs that are received at the signal input and that the user has selected for recording. In one embodiment, the memory is a hard drive that is capable of storing up to 80 hours of television programs. In other embodiments the hard drive can store between 10 and 200 hours of television programs. The present invention is not limited to the amount of storage space the personal video recorder 700 is capable of storing. In accordance with the present invention, the user is able to partially delete a portion of a stored video in order to allow for more space in the memory 704 for recording other television programs.

In operation the processor 702 controls the signals that will be output from the signal output 710 to the display monitor. In accordance with the present invention the processor 702 is configured in one embodiment to provide a free memory list for the electronic storage medium; select a portion of a file stored on the electronic storage medium and add the selected portion of the file to the free memory list. In a preferred embodiment, the file is an audio/video file.

In another embodiment, the processor 702 can be configured to store a video file on a memory of the personal video recorder; receive a signal for marking a starting flag for the video file; receive a signal for marking an ending flag for the video file; and free the memory of the personal video recorder that contains a portion of the video file between the starting flag and the delete flag.

In a further embodiment, the processor 702 can be configured to search for a start program time stamp marking a video file; search for a first full image frame related to the start program time stamp; search for an end program time stamp marking the video file; search for a second full image frame related to the end program time stamp; and delete a portion of the video file between the first full image frame and the second full image frame. The processor 702 as shown can either be one processor or a combination of individual processors each with different tasks. The processor 702 thus represents any combination of one or more processors included in the personal video recorder 700.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

We claim:

1. A method of increasing the available storage space in a memory comprising the steps of:

storing a first file in the memory, the first file including a plurality of individual sectors and being separate and self-contained from a second file stored in the memory, the plurality sectors of the first file being configured to be linked together and presentable to a user as a complete audiovisual presentation, the sectors being portions of the presentation, the sectors being of substantially the same size;

defining in the memory a free memory list, the free memory list exclusively defining deallocated memory sectors the free memory list being configured to vary in size over time;

selecting a portion of the presentation for deletion, the portion being smaller than the entire presentation, the beginning of the portion marked with a first deletion point and the end of the portion being marked with a second deletion point;

mapping the selected portion that is marked by the first deletion point and the second deletion point to one or more of the sectors within the first file;

deallocating the one or more mapped sectors from the file and appending the deallocated one or more mapped sectors of the file to the free memory list;

amending the first file to link the remaining sectors of the file together so that the presentation can be presented to the user continuously and without substantially any time discontinuities.

2. The method of claim 1 wherein the first file is an audio file or a video file.

3. The method of claim 1 wherein the memory is a memory of a personal video recorder.

* * * * *